Patented Oct. 12, 1948

2,451,299

UNITED STATES PATENT OFFICE 2,451,299

SULFOLANYL ESTERS

Rupert C. Morris, Berkeley, and Edward C. Shokal, Oakland, Calif., assignors to Shell Development Company, San Francisco, Calif., a corporation of Delaware No Drawing. Application August 1, 1945, Serial No. 608,375

3 Claims. (Cl. 260—329)

This invention relates to a novel and particularly useful class of compounds comprising the cyclic sulfones having at least one of the nuclear carbon atoms directly attached to the acyloxy radical of a higher saturated monocarboxylic acid. More particularly, the invention pertains to sulfolanyl and sulfolenyl esters of the higher saturated monocarboxylic acids having at least six carbon atoms.

The term "sulfolane" refers to a compound having a saturated cyclic structure containing four carbon atoms and a sulfur atom in a ring, the sulfur atom of this five-membered heterocyclic ring having two oxygen atoms attached thereto. The structural formula of sulfolane is:

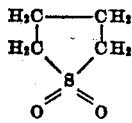

This compound has also been called "thiacyclopentane-1,1-dioxide," "thiolane-1,1-dioxide," "cyclotetramethylene sulfone" or "dihydrobutadiene sulfone." As employed herein, the term "a sulfolanyl radical" is the radical resulting from the removal of one or more hydrogen atoms from the nuclear carbon atoms in sulfolane, and compounds containing such a radical, including sulfolane itself, are generically referred to herein as "sulfolanyl compounds."

The term "sulfolene," as employed herein, refers to an unsaturated compound containing four carbon atoms and a sulfur atom in a ring, said structure having a single olefinic linkage between two adjoining carbon atoms, with the sulfur atom having two oxygen atoms attached thereto, and with the remaining free bonds of the nuclear carbon atoms in the ring being attached to hydrogen atoms. This compound has also been termed "thiacyclopentene-1,1-dioxide." The compound having the structure:

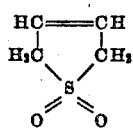

is termed 3-sulfonlene, whereas that having the structure:

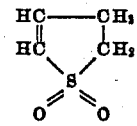

is termed 2-sulfolene. The term "a sulfolenyl radical" is the radical resulting from the removal of one or more hydrogen atoms from the nuclear carbon atoms in sulfolene, the radical being prefixed by either 2- or 3- when referring to particular compounds. Compounds containing such a radical, including 2- or 3-sulfolene itself, are generically referred to herein as "sulfolenyl compounds."

In accordance with well-recognized nomenclature practice, the terms sulfolane and either 2- or 3-sulfolene may also form part of the name of various substituted compounds, as 3-sulfolanol, sulfolan-2,4-diol, 2-sulfolen-4-ol and 2-sulfolen-4,5-diol, such compounds being formed by substituting for one or more of the hydrogen atoms attached to the carbon-sulfur nucleus a corresonding number of other functional groups in the numbered position of the ring indicated in the case of each particular compound.

The term "acyloxy radical of a higher saturated monocarboxylic acid" refers to a radical having the general formula

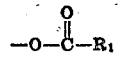

wherein $R_1$ is a saturated organic radical, preferably a saturated hydrocarbon radical containing at least five carbon atoms.

An object of the invention is to provide a novel class of compounds possessing unexpected and useful properties. Further objects will be apparent from the following description of the invention.

Esters of the type of 3-sulfolanyl acetate are disclosed in the prior art. In all of these compounds the radical which is attached by means of the carboxyl (—COO—) linkage to the sulfolanyl or sulfolenyl radical is the methyl radical which contains just one carbon atom. Compounds have now been prepared wherein the radical joined to the cyclic sulfone group by means of the carboxyl radical is a saturated hydrocarbon radical of at least five carbon atoms. In other words, the newly prepared compounds comprise a sulfolanyl or sulfolenyl radical linked to at least one saturated acyloxy radical of at least six carbon atoms. Surprisingly, it has been found that these higher saturated esters of the invention possess properties which are markedly superior to those of the esters of the lower acids, e. g. sulfolanyl acetate. A sulfolanyl acetate is a water-soluble compound which is quite unstable and therefore not suited for many purposes. For example, sulfolanyl acetate is not of value as a plasticizer because of its instability. However, it has been found that the sulfolanyl and sulfolenyl esters of the higher saturated monocarboxylic acids are water-insoluble and highly stable, and are of exceptional value as plasticizers for natural or synthetic resins, plastics, and rubbers. For example, the sulfolanyl or sulfolenyl esters of the higher saturated monocarboxylic acids such as sulfolanyl caproate and sulfolanyl naphthenate are particularly valuable as plasticizers, e. g. for cellulose acetate and vinyl chloride polymers. Morever, these sulfolanyl and sulfolenyl higher esters possess qualities markedly superior to those of the corresponding esters of the unsaturated acids, particularly as plasticizers for use in the preparation of clear, water-white resins and the like. For the sulfolanyl esters of the unsaturated acids, e. g. sulfolanyl oleate, are unstable and readily undergo further reaction e. g. oxidation on standing, and turn yellow, while the higher saturated monocarboxylic acid esters are stable and do not change color upon standing. These properties could not be foreseen, and they are of such a nature as to make the compounds of the invention particularly useful in many applications.

The novel compounds of the invention comprise the substituted or unsubstituted sulfolanyl and sulfolenyl derivatives wherein at least one nuclear carbon atom is directly attached to an acyloxy radical of a higher saturated monocarboxylic acid. The novel sulfolanyl higher esters, i. e. compounds in which at least one of the nuclear carbon atoms of a sulfolane ring is directly attached to the acyloxy radical of a higher saturated monocarboxylic acid of at least six carbon atoms, may be represented by the general structural formula:

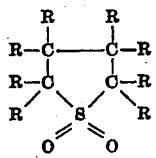

wherein at least one of the R radicals attached to a nuclear carbon atom is a saturated acyloxy radical of at least six carbon atoms, while the remaining R radicals may be the same or different and are members of the group consisting of the hydrogen atom and the hydrocarbon radicals.

Similarly, in the case of the novel sulfolenyl derivatives, the general structural formula is substantially the same as presented above, with the exception that the cyclic sulfone ring contains a double bond between two vicinal carbon atoms of the ring structure.

A preferred subgroup of the novel compounds comprises the sulfolanyl and sulfolenyl compounds in which a single saturated acyloxy radical of at least six carbon atoms is directly attached to the ring carbon atom in the 3-position, the remaining free bonds of the nuclear carbon atoms being taken up by hydrogen atoms and/or saturated aliphatic hydrocarbon radicals. The novel subgroup of 3-sulfolanyl esters is represented by the following general structural formula:

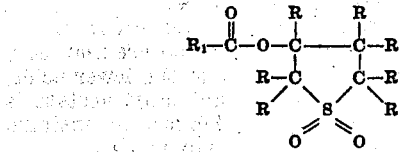

wherein $R_1$ designates a saturated hydrocarbon radical containing at least five carbon atoms which is preferably an alkyl radical, and the R's are members of the group consisting of the hydrogen atom and the saturated aliphatic hydrocarbon radicals. For example, when $R_1$ is the n-amyl radical and each R is a hydrogen atom, the above formula represents 3-sulfolanyl caproate, that is the caproic acid ester of 3-sulfolanol.

Another group of suitable compounds consists of the esters of the 3,4-sulfolandiols and 3,4-sulfolendiols in which both ring-attached hydroxy groups are esterified by higher saturated monocarboxylic acids, e. g. sulfolandiol-3-caproate-4-naphthenate, sulfolandiol-3,4-dinaphthenate, and the like.

The higher saturated monocarboxylic acid ester compounds of the invention may be prepared by an esterification reaction between the carboxylic acid and a cyclic sulfone containing at least one hydroxyl radical directly attached to one of the nuclear carbon atoms. Suitable hydroxylated cyclic sulfones which may thus be esterified are 3-sulfolanol, 2-sulfolen-4-ol, sulfolan-3,4-diol, sulfolan-2,3-diol, sulfolan-2,4-diol, 2-sulfolen-5-ol, 2-sulfolen-4,5-diol, and the various hydrocarbon-substituted hydroxylated sulfolanyl and sulfolenyl compounds such as 3-methyl-3-sulfolanol, 2-ethyl-3-sulfolanol, 3-methyl-2-sulfolanol, 2-methyl-3-ethyl-3-sulfolanol, 2-methylsulfolan-3,4-diol, 2,4-dimethyl-3-sulfolanol, and the like and their homologues and analogues. The higher saturated monocarboxylic acids which may be employed as one of the two reactants in the production of the novel saturated esters are characterized by possessing a carboxyl group linked to a saturated hydrocarbon of at least five carbon atoms. The saturated monocarboxylic acids which may be employed singly or in mixtures include: caproic acid, heptoic acid, caprylic acid, pelargonic acid, capric acid, undecylic acid, lauric acid, tridecylic acid, myristic acid, pentadecylic acid, palmitic acid, margaric acid, stearic acid, nondecylic acid, arachidic acid, the naphthenic acids, cyclopentane monocarboxylic acid, 3,3,4-trimethylcyclopentane-1-acetic acid, isocampholic acid, cyclohexane monocarboxylic acid, eicosane-carboxylic acid-(1), behenic acid, lignoceric acid, cerotic acid, melissic acid, psyllastearic acid, and the like and their homologues, analogues and suitable substitution products.

The esterification reaction may be executed in the presence or absence of a catalyst. Suitable promoters or catalysts which may be used to accelerate the rate of esterification are the strong mineral acids such as $H_2SO_4$, $H_3PO_4$, $H_2S_2O_7$, $HPO_3$, $HCl$, $HBr$, $H_4P_2O_7$, $HClO_3$, $HClO_4$, $HNO_3$, and the like. Mineral acid substances of the type of $SO_2Cl_2$, $SOCl_2$, $SOBr_2$, $NO_2$, $N_2O_3$, $NOCl$, $PCl_3$, $PCl_5$, and the like may also be employed. Inorganic acid-acting salts such as $ZnSO_4$, $ZnCl_2$, $ZnBr_2$, $FeCl_3$, $AlCl_3$, $CoCl_2$, $NiCl_2$, $Fe_2(SO_4)_3$, $Al_2(SO_4)_3$, $NaHSO_4$, $NaH_2PO_4$, and the like may also be used. Organic acid-acting compounds such as benzenesulfonic acid, p-toluene sulfonic acid, and their homologues and analogues, dialkyl and acid alkyl sulfates, alkylated phosphoric acid and sulfonic acids, etc., may also be employed alone or in combination with any of the above-mentioned or other suitable substances as catalysts for the esterification reaction.

The esterification reaction may be executed in any number of ways. One method of esterification comprises heating the saturated monocarboxylic acid of six or more carbon atoms in contact with the hydroxylated cyclic sulfone, preferably in a suitable reaction vessel equipped with means for agitating the reactants. The reactants may be introduced into the reactor separately, or they may be mixed prior to their introduction thereinto. In many cases it is desirable to effect the esterification by heating the reactants at about the boiling temperature of the reaction mixture at approximately atmospheric pressure. However, in some instances, the use of super-atmospheric pressures and higher temperatures may be found to speed up the reaction.

The rate of esterification may be increased and the occurrence of undesirable side reactions such as polymerization or hydrolysis of the ester product, and the like, may be prevented by operating in such a manner that the ester and/or the water formed as the result of the esterification of, for example, 3-sulfolanol and a higher saturated monocarboxylic acid of the class defined hereinabove, are removed from the reaction mixture substantially as soon as they are formed. In some instances, this removal may be effected by allowing the process to take place at a temperature sufficiently high to permit distillation of the ester and/or water from the reaction mixture. Thus, it is possible to operate with a distilling or fractionating apparatus which is in direct communication with the reaction vessel in such a manner that vapors from the latter are introduced at a suitable point in the separating column. In most cases the distilling apparatus is operated under heavy reflux with concurrent distillation of azeotropic mixtures comprising the ester, water and other constituents of the reaction mixture from the reaction vessel. In some instances it may be desirable to aid the removal of the ester and/or water by effecting the reaction in the presence of an inert substance which may or may not form low-boiling azeotropic mixtures with the reaction products under the operating conditions. Certain hydrocarbons, and particularly aromatic hydrocarbons, e. g. benzene, are among the suitable inert substances which may be employed for this purpose.

The vapors removed from the reaction vessel may be condensed and the novel esters of the hydroxylated sulfolanyl and/or sulfolenyl compounds may be recovered therefrom by any suitable means such as stratification, fractionation, extraction, salting out, use of drying agents, and the like, the particular recovery system to be employed being dependent upon the physical and especially upon the azeotropic properties of the condensate and its constituents.

The novel esters may be prepared by reacting a single monohydroxy or polyhydroxy sulfolanyl or sulfolenyl compound with a single saturated monocarboxylic acid of at least six carbon atoms. Mixed esters may be prepared by reacting a polyhydroxylated cyclic sulfone with a mixture of different saturated monocarboxylic acids each of which contains at least six carbon atoms. Also included in the scope of the invention are those mixed esters formed by reacting a polyhydroxylated sulfolanyl or sulfolenyl compound with a mixture of a higher saturated monocarboxylic acid with one or more different carboxylic acids, e. g. sulfolanediol-3-caproate-4-acetate.

The following examples serve to illustrate the invention.

*Example I*

3-sulfolanyl caproate was prepared by warming until homogeneous a mixture of about 642 parts by weight of 3-sulfolanol and about 480 parts by weight of technical caproic acid with approximately 38 parts by weight of 80 per cent sulfuric acid, adding approximately 500 cc. of benzene and refluxing with a kettle temperature in the neighborhood of 110° C. Water was removed by means of a separating stillhead, the reaction mixture was washed and distilled. The 3-sulfolanyl caproate recovered has a boiling point of 127° C. to 130° C. at 0.5 mm. and melts at 39° C. to 40° C.

*Example II*

3-sulfolanyl stearate is prepared by reacting 3-sulfolanol with stearic acid according to the procedure described in Example I.

*Example III*

A mixture of about 293 grams of 3-sulfolanol, 500 grams of naphthenic acids of an average equivalent weight of 214, 25 grams of concentrated sulfuric acid and about 300 cc. of benzene was refluxed for several hours. Water was removed azeotropically, and the reaction mixture washed and distilled. There was obtained about 558.5 grams of 3-sulfolanyl naphthenate which had a boiling point of 165° C. to 176° C. at about 1 mm.

*Example IV*

2-sulfolen-4-ol is reacted with caproic acid according to the process described in Example III to obtain a good yield of 4-(2-sulfolenyl) caproate.

The novel sulfolanyl and sulfolenyl esters of the higher saturated monocarboxylic acids may also be formed by a variety of other suitable methods, such as by acid-exchange or by ester-exchange. For example, the aforementioned 3-sulfolanyl caproate may be formed by an interaction between an alkyl caproate, e. g. methyl caproate, and 3-sulfolanol under such conditions that an ester exchange is effected with the concurrent formation of the desired 3-sulfolanyl caproate and of the alkanol, i. e. methanol. This process may also be employed to produce the unsaturated sulfolenyl esters, for example, by an ester-exchange between methyl caproate and 3-sulfolenol.

By following the procedures described above there may also be prepared 3-sulfolanyl heptoate, 2-methyl-3-sulfolanyl caprylate, 3-ethyl-3-sulfolanyl laurate, 3-sulfolanyl palmitate, 4-methyl-3-sulfolanyl stearate, 2-sulfolanyl naphthenate, 3-(2-sulfolenyl) pelargonate, 3-(2-sulfolenyl) undecylate, sulfolandiol-3,4-dicaproate, sulfolandiol-3-caproate-4-naphthenate, sulfolandiol-3-caproate-4-palmitate, sulfolandiol-3-caprylate-4-stearate, sulfolandiol-3,4-distearate, sulfolandiol-2-caproate-3-naphthenate, and the like and their homologues and analogues.

The novel products of the present invention find utility in a large variety of industries. The compounds are suitable as intermediates for the manufacture of other products which are also highly useful. The novel compounds are particularly useful in the natural and synthetic resin and lacquer industries, and they may be used as insecticides, parasiticides and fungicides or as ingredients of insecticidal, parasiticidal and fungicidal compositions. When the higher saturated esters of the cyclic sulfones are further reacted, e. g. sulfated, they may serve as detergents. The compounds also find utility in the preparation of printing inks and anti-corroding paints.

We claim as our invention:
1. 3-sulfolanyl caproate having the structure

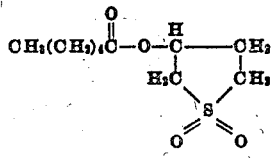

2. 3-sulfolanyl naphthenate having the structure

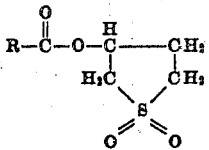

wherein

represents the acyloxy radical of naphthenic acid.

3. A sulfolanyl ester having the structure

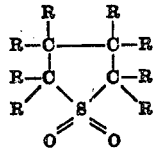

wherein at least one of the R's is an acyloxy radical of the structure

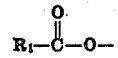

in which $R_1$ is a saturated hydrocarbon radical containing at least five carbon atoms, and wherein each of the other R's is a member selected from the group consisting of the hydrogen atom and the saturated aliphatic hydrocarbon radicals.

RUPERT C. MORRIS.
EDWARD C. SHOKAL.

REFERENCES CITED

The following references are of record in the file of this patent:

UNITED STATES PATENTS

| Number | Name | Date |
|---|---|---|
| 2,219,006 | Delfs | Oct. 22, 1940 |
| 2,372,160 | Morris et al. | Mar. 20, 1945 |
| 2,393,925 | Morris et al. | Jan. 29, 1946 |

OTHER REFERENCES

Backer: Recueil des Travaux des Chimique des Pays Bas, vol. 53, page 527 (1934).